Feb. 23, 1926.

C. TORGERSEN

AUTOMATIC SCALE

Filed Sept. 6, 1924     4 Sheets-Sheet 1

1,573,950

Feb. 23, 1926.

C. TORGERSEN

AUTOMATIC SCALE

Filed Sept. 6, 1924 4 Sheets-Sheet 2

Inventor
C. Torgersen
By Marks & Clerk
Attys.

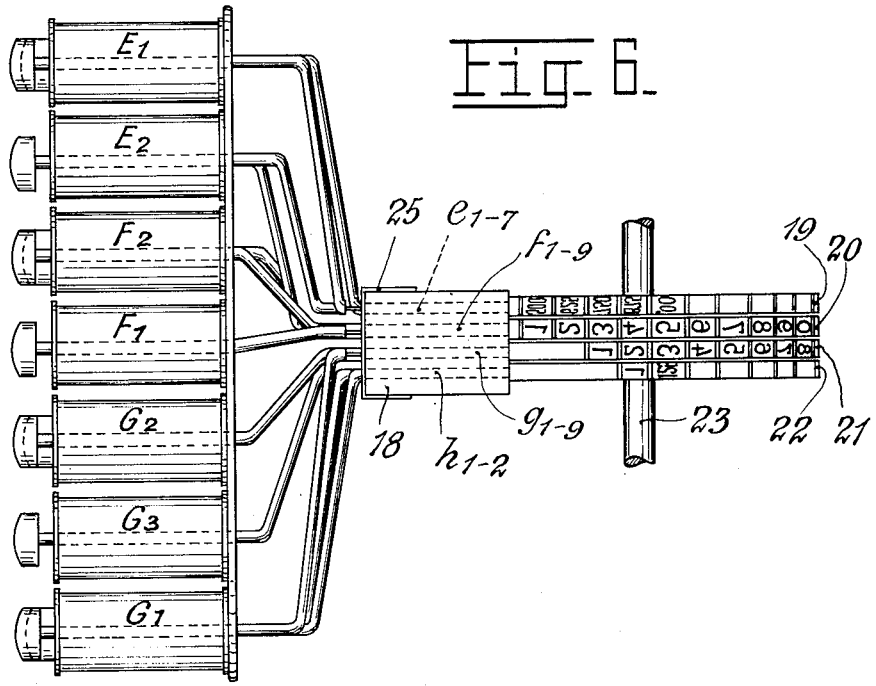
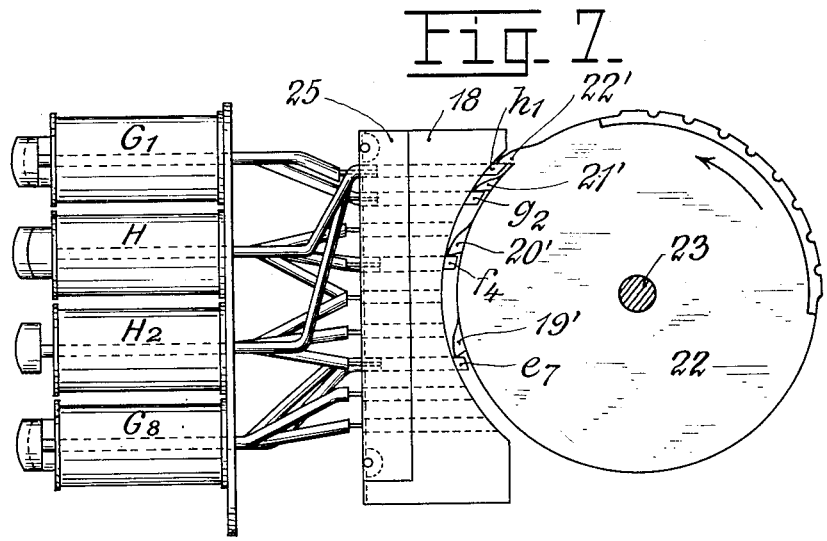

Feb. 23, 1926. 1,573,950
C. TORGERSEN
AUTOMATIC SCALE
Filed Sept. 6, 1924 4 Sheets-Sheet 4
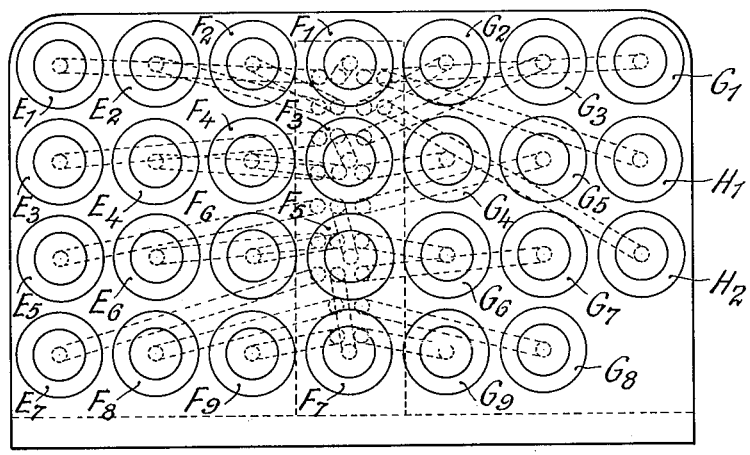
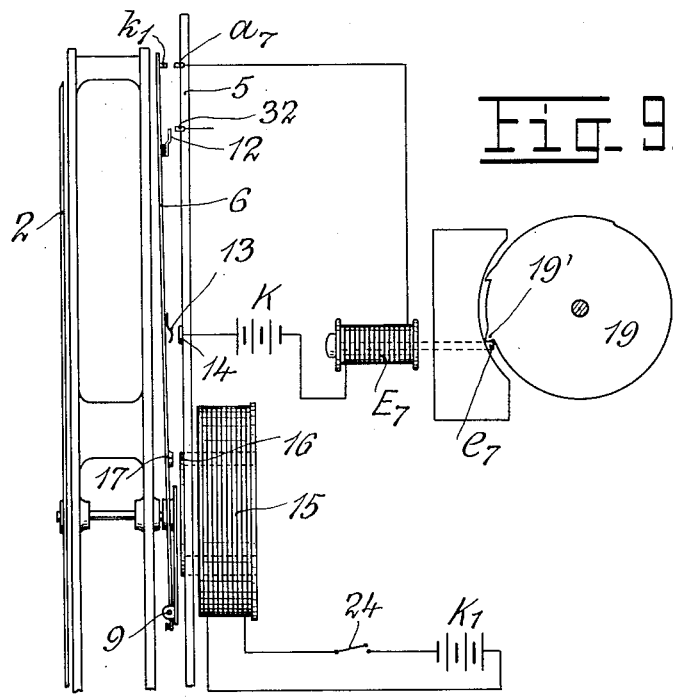
Inventor
C. Torgersen Patented Feb. 23, 1926.

1,573,950

UNITED STATES PATENT OFFICE.

CARL TORGERSEN, OF STABAEK, NEAR CHRISTIANIA, NORWAY.

AUTOMATIC SCALE.

Application filed September 6, 1924. Serial No. 736,330.

*To all whom it may concern:*

Be it known that I, CARL TORGERSEN, a subject of the King of Norway, and residing at Carlsborg, Stabaek, near Christiania, Norway, have invented certain new and useful Improvements in Automatic Scales, of which the following is a specification.

The present invention relates to improvements in automatic scales, whereby it will be possible to print the exact result of the weighing on a coupon or ticket by the use of a coupon or ticket printing apparatus, arranged in connection with the scale.

The invention is substantially characterized by a contact arm, oscillating synchronically with the pointer of the scale, which contact arm moves over electrical contacts corresponding to the graduation of the scale, and may swing in a plane perpendicular to the oscillating plane of the scale, so that it may be brought into contact with one or more of the said contacts whereby current circuits are closed, that energize locking electro-magnets for adjusting numeral discs at the same numerals as those indicated by the pointer of the scale.

The invention is illustrated in the accompanying drawings in which:

Figure 5 shows a front elevation of a contact arm.

Figure 6 is a plan view of numeral discs in the ticket printing apparatus with their locking magnets.

Figure 7 shows a side elevation of the same.

Figure 8 shows a front elevation of the locking magnets.

Figure 9 is a view of a wiring diagram for one of the locking magnets.

Figure 1:
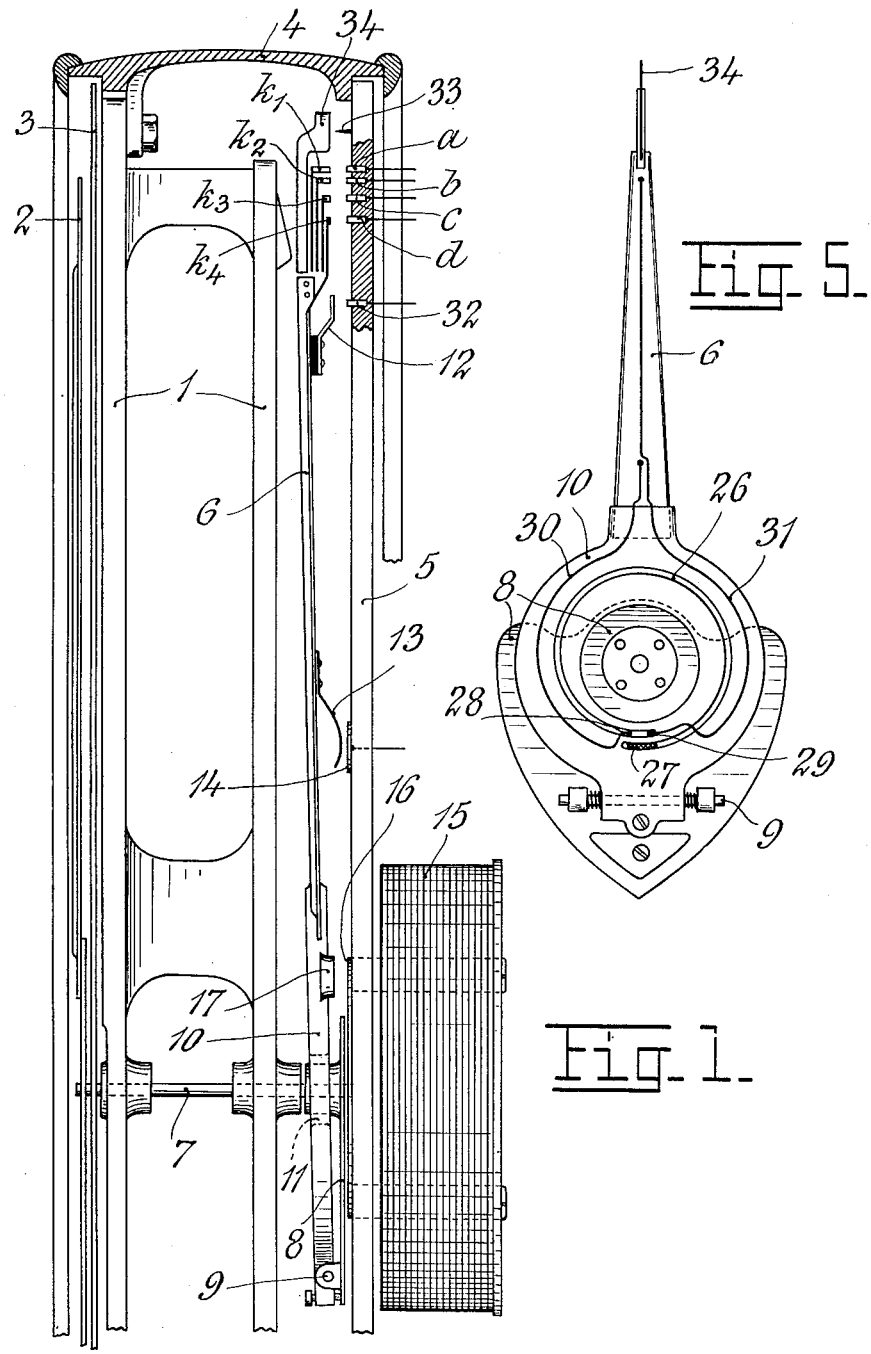
Figure 1 shows a part of a scale with the arrangement in part sectional elevation.

Referring to Figure 1, 1 indicates the frame for a common automatic scale with circular disc, 2 is the pointer of the scale, 3 is the numeral sheet on which the graduation of the scale is arranged.

Behind the frame 1 and connected with the same by an annular casing 4 is arranged a fixed contact plate 5, provided with contacts $a$, $b$, $c$ and $d$ (see Figures 2, 3 and 4), arranged in arcs of circles and insulated from each other, over which oscillates a contact arm 6 which moves synchronously with the pointer 2 of the scale. For that purpose a shaft 7 for the pointer 2 is extended rearwardly and there keyed to a disc-formed part 8 to which is pivotally fixed a second disc 10 at a proper distance from the shaft 7. To the said disc is fixed the contact arm 6, but electrically insulated from the same.

The disc 10 has a central hole 11, so that it may move together with the contact arm 6 towards the plate 5. Opposite to the contacts $a$, $b$, $c$ and $d$ on the plate 5 the contact arm 6 is provided with small spring contacts $k_1$, $k_2$, $k_3$, $k_4$, which are electrically connected with the contact arm. Further two spring contacts 12 and 13 are fixed to the same of which 12 is electrically insulated from the contact arm, while 13 is electrically connected with the same.

During the oscillation of the contact arm the spring contact 13 moves opposite to a circular contact band 14, fixed to the plate 5. To this disc there is also centrally arranged a main electro-magnet 15 with annular iron core 16 in front of which an iron piece or armature 17, fixed to the second disc 10, moves during the oscillation of the contact arm.

Figure 2:
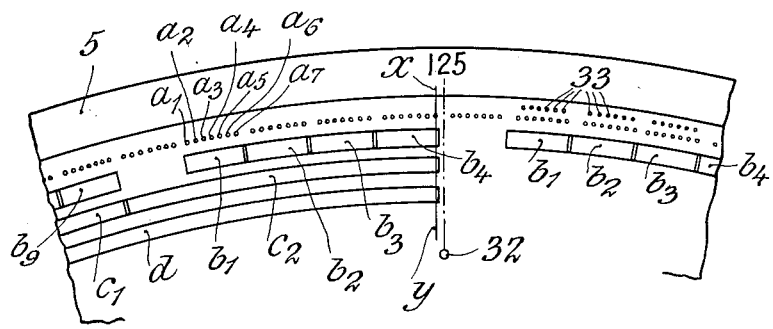
Figures 2, 3 and 4 are enlarged views of three different parts of a contact plate.
Figure 3:
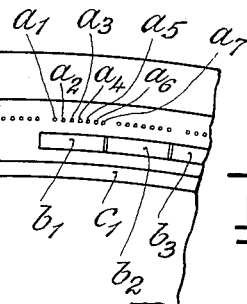
Figure 4:
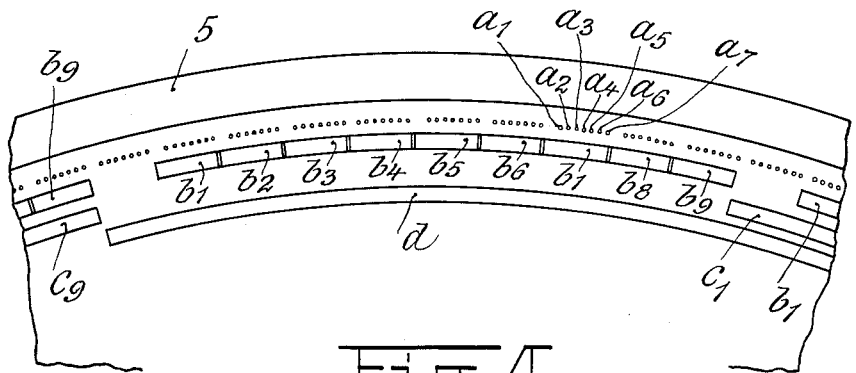

The contacts $a$, $b$, $c$, $d$, circularly arranged on the plate 5, are shown in Figures 2, 3 and 4 in enlarged fragments of the plate 5; the number of contacts and the position of the same to one another depend on the graduation of the scale and the accuracy of the weighing. In the example shown the scale is supposed to be able to weigh from 0 to 125 kilogrammes with an accuracy or smallest graduation of the scale of 125 grammes. In this case the contacts $a$ for fractions of one kilo must be arranged in groups of seven, so that the first contact $a_1$ is covered by the contact arm 6 at the same time as the pointer 2 covers the graduating line for 125 grammes. The contacts $b$ and $c$ respectively for full kilos and ten kilos must be arranged in groups of nine and the contact $d$ for hundred kilos must be arranged as one single contact band. The arrangement of these contacts is clearly shown in Figures 2, 3 and 4, which show fragments of the contact plate 5 with 0 kg. (125 kg.), 10 kg. and 100 kg. All the contacts $a$ with the same index number are connected to one another and by a conductor connected to a locking magnet in the ticket printing apparatus. Thus in the example shown there are seven locking magnets for the contacts $a$. All the contacts $b$ with the same index number are also connected to one another and by a conductor connected to a locking magnet, and subsequently for these there are nine locking magnets in all. In the same manner the contacts $c$ with the same index number are connected to each other and also for these there are nine locking magnets. The contact $d$, of which there is only one in the example shown, is also connected to a locking magnet.

These locking magnets are shown in Figures 6, 7 and 8 respectively in plan, side elevation and front elevation. The seven locking magnets for the contacts $a_1$—$a_7$ are indicated by $E_1$—$E_7$ and the nine locking magnets for the contacts $b_1$—$b_9$ and $c_1$—$c_9$ are indicated by $F_1$—$F_9$ and $G_1$—$G_9$ respectively. The locking magnet for the contact band $d$ is indicated by $H_1$. $H_2$ is an electro-magnet which is energized at maximum weighing as further explained in the specification.

The armatures for the locking magnets $E_1$—$E_7$ are connected to locking teeth $e_1$—$e_7$ lying above each other in the same vertical plane. In the same manner the armatures for the nine locking magnets $F_1$—$F_9$ and $G_1$—$G_9$ respectively are connected to locking teeth $f_1$—$f_9$ and $g_1$—$g_9$ lying above each other in planes lying side by side. The armature for the locking magnet $H_1$ is connected to a locking tooth $h_1$. All the locking teeth are slidably arranged in guides in the frame 18, situated opposite to the numeral discs 19, 20, 21 and 22 in the ticket printing apparatus.

As shown in Figure 6 the locking teeth $e_1$—$e_7$ are situated opposite to the numeral disc 19, provided with numerals indicating grammes (125, 250 and so on 875). In the same manner the locking teeth $f_1$—$f_9$, $g_1$—$g_9$ and $h_1$ are situated opposite to the numeral discs 20, 21 and 22 respectively, for full kilos, tens of kilos and hundreds of kilos. On a part of the circumference the numeral discs 19, 20, 21 and 22 are enclosed by the frame 18 and each is provided with a locking notch or tooth 19′, 20′, 21′ and 22′ respectively, which co-operate with the corresponding locking teeth. All the numeral discs are flexibly connected to the shaft 23 in such a manner that the discs, the teeth of which do not strike the locking teeth, will rotate with the shaft ¼ of a revolution, while the disc or discs which are stopped by an extending locking tooth remain in this position.

On the circumference the numeral discs 19, 20, 21 and 22 have printing types for grammes, full kilos, tens of kilos and hundreds of kilos respectively, and these are so arranged in relation to the tooth of the disc and to the locking teeth, controlled by the locking electro-magnets, that the discs will be adjusted with the proper numeral at the top after the locking teeth are adjusted and the shaft is turned ¼ of a revolution.

In Figure 9 is shown a wiring diagram for one of the interconnected contacts on the plate 5. Assuming $a_7$ is one of the contacts, then $E_7$ indicates the locking electro-magnet to which these contacts are connected, $e_7$ is the locking tooth connected to the armature of the electro-magnet $E_7$, and this locking tooth lies opposite to the numeral disc 19, which carries the numerals for grammes. In the same manner the other interconnected contacts on the plate 5 are connected to the corresponding locking magnets. K indicates a battery in the circuit for the electro-magnets for the locking teeth and $K_1$ a battery in the circuit for the main electro-magnet 15, which circuit may be closed by a contact 24, whereby the electro-magnet is energized and attracts the contact arm 6.

Supposing that we are weighing an article the weight of which is 124.875 kg., the contact arm 6 will take a position in relation to the contact plate 5 as indicated by the line $x$—$y$ in Figure 2, at the same time as the pointer of the scale stands opposite the above mentioned figure on the numeral scale.

By closing the contact 24 (Figure 9) the current from the battery $K_1$ will energize the main electro-magnet 15, whereby the armature 17 is attracted, and as this is fixed to the contact arm 6, the same will swing about the bolt 9, towards the plate.

During this movement the spring contact $k_1$ will make contact with the contact $a_7$ at the same time as the spring contact 13 makes contact with the circular contact band 14. As it will appear from Figure 9 a circuit will be closed, extending from the battery K through the contact band 14, the spring contact 13, the contact arm 6, the spring contact $k_1$, the contact $a_7$, the locking magnet $E_7$, and back to the battery K. Hereby the armature of the electro-magnet $E_7$ is attracted and as this is connected to the locking tooth $e_7$, as above explained, this locking tooth will be pushed into locking position for the numeral disc 19. In a similar manner the spring contact $k_2$, which simultaneously will make contact with the contact $b_4$, will close the circuit from the battery K, which energizes the electro-magnet $F_4$ to which the contacts $b_4$ are connected, and the locking tooth $f_4$ will be pushed in locking position for the numeral disc 20.

In the same manner the spring contacts $k_3$ and $k_4$ making contact with $c_2$ and $d$ respectively, cause the locking teeth $g_2$ and $h_1$ to enter into locking position for the numeral discs 21 and 22 respectively.

When the locking teeth in this manner are brought into position in front of their respective numeral discs, the shaft 23 is turned ¼ of a revolution, whereby the disc 19 by the tooth 19' and the locking tooth $e_7$ is locked in such a position that the figures 875 will be placed at the top.

In similar manner the numeral discs 20, 21 and 22 will be adjusted by their teeth and the respective locking teeth, so that the figures 4, 2 and 1 respectively will be placed at the top. It will be seen that in this manner the numeral discs are so adjusted that at the top they show the same figure as that on which the pointer of the scale stops opposite to the numeral scale, in this case 124.875. In this position the numeral discs are shown in Figures 6 and 7 and the figure will be seen in reverse at the top of the same. These figures may now, in known manner, be printed on a paper strip, which after the printing, is cut off and automatically delivered.

The locking teeth are brought back to the start position by a U-shaped bar 25 which is adapted to be pushed to the left in Figure 7.

As, in the shown scale, the contact arm 6 will take the same position for 0 and 125 kg., the following arrangement is made to distinguish zero and maximum weighing.

To the disc 10, which carries the contact arm 6, is fixed a hollow closed spiral 26, into which is placed a mercury globule 27, a metal ball or the like. The two ends of the spiral overlap each other as shown on the drawing, and when the pointer indicates zero the spiral ends lie below the rotary axis of the contact arm. In the end of the spiral nearest to the rotary axis two contacts 28 and 29 are arranged at a small distance from each other. From each of these lead conductors 30 and 31 which terminate in the contacts 13 and 12 respectively, on the contact arm 6. The contact 12 is situated in the same radial distance from the swinging axis of the contact arm as a contact 32 on the plate 5, in such a manner that these contacts are situated opposite to each other when the contact arm stands in vertical position. As above mentioned the contact 12 is insulated from the contact arm 6, while the contact 13 is electrically connected with the same. By means of a conductor the contact 32 is connected to the locking magnet $H_2$, the armature of which is connected to a locking tooth $h_2$, situated opposite to the numeral disc 22 which on its circumference carries the numerals for 125 kg. It will be seen, that when the contact arm 6 has turned one revolution, the mercury globule 27 has reached the inner end of the spiral 26 and has closed the contacts 28, 29. When now the contact arm 6 by energizing of the main electro-magnet 15 swings towards the plate 5, the spring contact 12 will close a current circuit through the contact 32, as the locking magnet $H_2$ connected to the same is put in the circuit for the battery K in a similar manner as the locking magnet $E_7$ in Figure 9. During this time the armature and locking tooth $h_2$ of the locking magnet $H_2$ will be set in locking position for the numeral disc 22 and during the following turning of the same it will be stopped in such a position that the figure 125 stands at the top of the disc.

To insure that the spring contacts $k_1$, $k_2$, $k_3$ and $k_4$ make correct contact during the movement inwards of the contact arm 6, small conical pegs 33 are arranged external to the contacts (some of which are shown at the right in Figure 2), and are so arranged in relation to the contacts $a$ that the latter are situated on the middle radial line between two pegs. To the outer end of the contact arm 6 is fixed a knife 34, and it will be seen that when the contact arm swings toward the plate 5, the spring contacts $k_1$, $k_2$, $k_3$ and $k_4$ will be exactly guided to the contacts on the plate.

The embodiment of the invention shown in the drawings is only given as an example, and changes therein may be made without departing from the scope of the invention.

Having now described my invention, what I claim as new and desire to secure by Letters Patent is:—

1. A device for adapting an automatic scale for recording the amount indicated by the pointer comprising an indicating pointer in combination with a contact arm that is adapted to oscillate synchronously with said pointer, electrical contacts corresponding with the graduations on the scale, over which the contact arm moves, means for swinging the contact arm in a plane perpendicular to the oscillating plane so that it is brought into contact with one or more of the said electrical contacts, locking electro-magnets, numeral discs, adjusting means therefor and electric means whereby the swinging of the contact arm closes electric circuits that energize the electro-magnets for adjusting the numeral discs to the same numerals as those indicated by the pointer on the scale.

2. A device for adapting an automatic scale for recording the amount indicated by the pointer, comprising an indicating pointer in combination with a fixed plate, a disc keyed to the oscillating shaft, a second disc hinged to the first mentioned disc at a suitable distance from the oscillating axis so as to swing in a plane perpendicular to the oscillating plane, a contact arm fixed to the second disc, spring contacts thereon, a main electro-magnet secured to the fixed plate and arranged centrally of the shaft, an armature therefor fixed on the contact arm, insulated electrical contacts on the fixed plate arranged in arcs of circles at the same radial distances as the spring contacts, locking electro-magnets connected with the insulated contacts, armatures for said electromagnets, locking teeth actuated therefrom, discs with numerals situated opposite the locking teeth, and electrical means whereby the energizing of the main electro-magnet swings the contact arm towards the fixed plate and closes electrical circuits that cause adjustment of the locking teeth in such manner that the numeral discs are locked in such position that the top of the discs show the same numerals as indicated by the pointer of the scale.

3. A device as claimed in claim 2 in combination with a hollow closed spiral fixed to the hinged disc, a movable contact member therein, two contacts near one end of said spiral, an insulated contact on the contact arm connected with one of the said two contacts, and a fixed contact on the fixed plate whereby when the contact arm is swung towards the plate an electric circuit is closed so that one of the numeral discs is adjusted with the figure for maximum weight at the top.

In testimony whereof I have signed my name to this specification.

CARL TORGERSEN.